Patented May 17, 1927.

1,628,838

UNITED STATES PATENT OFFICE.

HANS HAHL, OF ELBERFELD, NEAR COLOGNE-ON-THE-RHINE, GERMANY, ASSIGNOR TO WINTHROP CHEMICAL COMPANY, INC., OF NEW YORK, N. Y.

COMPLEX ANTIMONY COMPOUNDS AND PROCESS OF MAKING SAME.

No Drawing. Application filed March 29, 1926, Serial No. 98,272, and in Germany June 6, 1925.

The present invention has for its subject a new process for the manufacture of new complex antimony compounds and the products obtained.

According to this invention an antimonyl compound of such a polyphenol as contains two hydroxyl groups in the ortho-position to each other, is caused to interact either with a neutral salt of a carboxylic acid which contains in the molecule easily migratory hydrogen atoms as, for example, malonic acid, levulinic acid or diacetyl succinic acid.

The new compounds are in most cases colorless or only slightly colored substances, the neutral aqueous solutions of which are not precipitated by alkalies but are precipitated by alkali metal sulphides. They possess outstanding specific acting properties and are intended to find application in therapy. Their aqueous solutions possess no irritant effect and can be sterilized at 100° C.

The following examples serve to illustrate the invention:—

*Example 1.*—30 parts by weight of malonic acid are dissolved in 500 parts of water and neutralized with 100 parts of crystalline sodium carbonate, to the clear solution are then added 30 parts by weight of antimonyl pyrocatechin (Centralblatt 1898, II page 598) and heating is effected for some time. The greater part of the antimonyl pyrocatechin passes into solution, whereupon the liquid is filtered and the filtrate evaporated until the separation of crystals commences. On subsequent rapid cooling, the sodium salt of the complex antimonyl pyrocatechin malonic acid separates completely. After filtration, the product may be recrystallized from alcohol-acetone, as practically colorless needles, which are easily soluble in water with a neutral reaction. From the aqueous solution alkali metal sulphides precipitate the orange-red antimony sulphide.

*Example 2.*—To 30 parts by weight of malonic acid, a solution of 80 parts by weight of crystalline sodium carbonate in 250 parts of water is gradually added, and the clear solution is then heated for some time with 28 parts by weight of antimonyl gallic acid (Centralblatt 1898, II page 599) when the greater part of the antimonyl gallic acid passes into solution. The liquid is filtered and the acid filtrate evaporated until the separation of crystals commences and then cooled. The acid sodium salt of a complex antimonyl gallic-malonic acid soon separates, being obtained after filtration and drying in the form of a bright powder. With sodium carbonate, it is easily converted in aqueous solution into the neutral salt, which is stable towards alkalies, but gives a precipitate of antimony sulphide with alkali metal sulphides.

*Example 3.*—20 parts by weight of levulinic acid are neutralized with a solution of 25 parts by weight of crystalline sodium carbonate in 200 parts of water and heated for some time with the addition of 20 parts by weight of antimonyl pyrocatechin, the greater part of the latter passing into solution. The further treatment follows that described in Example 1. The sodium salt of a complex antimonyl pyrocatechin levulinic acid, after recrystallization from alcohol-acetone and drying forms a yellowish-white powder, which is easily soluble in water with a practically neutral reaction. The aqueous solution is stable towards alkalies but alkali metal sulphides precipitate antimony sulphide.

*Example 4.*—50 parts by weight of crystalline sodium carbonate are dissolved in 300 parts of water and added to a solution of 40 parts of levulinic acid in 100 parts of water. The whole is heated for some time with the addition of 60 parts by weight of antimonyl gallic acid, the greater part of the latter passing into solution. When the reaction is complete filtration takes place and the filtrate is caused to drop into alcohol. The acid sodium salt of a complex antimonyl gallic-levulinic acid is precipitated as an almost white powder. The product may be easily converted in aqueous solution into the neutral salt by means of sodium carbonate.

I claim:—

1. The process for the manufacture of complex antimony compounds, which process consists in causing an antimonyl compound of a polyphenol containing two hydroxyl groups in ortho-position to each other to interact with a neutral salt of a carboxylic acid containing in the molecule easily migratory hydrogen atoms.

2. The new complex antimony compounds derived from a carboxylic acid containing in the molecule easily migrating hydrogen atoms and an antimonyl compound of a polyphenol containing two hydroxyl groups in ortho-position to each other, being generally in the form of their alkali metal salts colorless or slightly colored substances, the neutral aqueous solutions of which are not precipitated by alkalies but are precipitated by alkali metal sulfides. Possessing outstanding specific acting properties, being intended to find application in therapy, their aqueous solutions possessing no irritant effect and being capable of being sterilized at 100° C.

3. A new complex antimony compound as defined in claim 2, being derived from malonic acid and an antimonyl pyrocatechin.

In testimony whereof I have hereunto set my hand.

HANS HAHL.